INVENTOR
James C. Heselwood

INVENTOR
James C. Heselwood

May 14, 1968  J. C. HESELWOOD  3,382,707
APPARATUS FOR ULTRASONICALLY SCANNING A TUBULAR MEMBER
Filed April 27, 1965  4 Sheets-Sheet 3

INVENTOR
James C. Heselwood

May 14, 1968    J. C. HESELWOOD    3,382,707
APPARATUS FOR ULTRASONICALLY SCANNING A TUBULAR MEMBER
Filed April 27, 1965    4 Sheets-Sheet 4

INVENTOR
James C. Heselwood

United States Patent Office 3,382,707
Patented May 14, 1968

3,382,707
APPARATUS FOR ULTRASONICALLY SCANNING A TUBULAR MEMBER
James C. Heselwood, Bethlehem, Pa., assignor to Bethlehem Steel Corporation, a corporation of Delaware
Filed Apr. 27, 1965, Ser. No. 451,136
19 Claims. (Cl. 73—71.5)

ABSTRACT OF THE DISCLOSURE

An ultrasonic transducer is mounted on a flexible disc attached to and rotated by a shaft, the longitudinal axis of the shaft perpendicularly intersecting the longitudinal axis of the tubular member and being movable in a direction parallel to the longitudinal axis of the tubular member. The disc edge is guided along a contour corresponding with that of the tubular member. The radiating axis of the transducer is normal to the surface of the tubular member at all times, and the distance between the transducer and the surface of the tubular member is constant.

---

This invention relates generally to ultrasonic thickness-measuring apparatus. More specifically, this invention relates to apparatus for ultrasonically measuring wall thickness in a moving tubular member.

During automatic welding of resistance-welded pipe, a flash or edge of metal is left protruding inside the pipe at the weld. This flash is removed by a cutting tool after the welding operation, and sometimes, the wall of the pipe is inadvertently cut into, thereby reducing the strength and quality of the pipe. It is therefore necessary to determine the thickness of the pipe wall in the region of the weld after the removal of flash, in order to determine whether or not the wall thickness has been reduced. Individual or "spot" measurements of wall thickness by ultrasonic methods are readily made on stationary samples of pipe using conventional equipment. However, this operation is time-consuming and does not give a continuous indication of wall thickness at production speeds.

The problem has been to continuously measure the wall thickness of resistance-welded pipe at those speeds at which the said pipe is produced.

One of the objects of this invention is to provide improved ultrasonic thickness-measuring apparatus.

Another of the objects of this invention is to provide improved ultrasonic thickness-measuring apparatus for measuring wall thickness in a moving tubular member.

A further object of this invention is to provide improved ultrasonic thickness-measuring apparatus for accurately measuring wall thickness in the weld area of continuously moving electric resistance welded pipe.

I have discovered that the foregoing objects can be attained by revolving an ultrasonic transducer about an axis intersecting the longitudinal axis of the pipe being scanned for thickness variations, so that the radiating axis of the ultrasonic transducer is normal to the pipe wall curvature at all times as the ultrasonic transducer moves back and forth across the longitudinal weld in the pipe wall.

Referring to the drawings.

Figure 1:
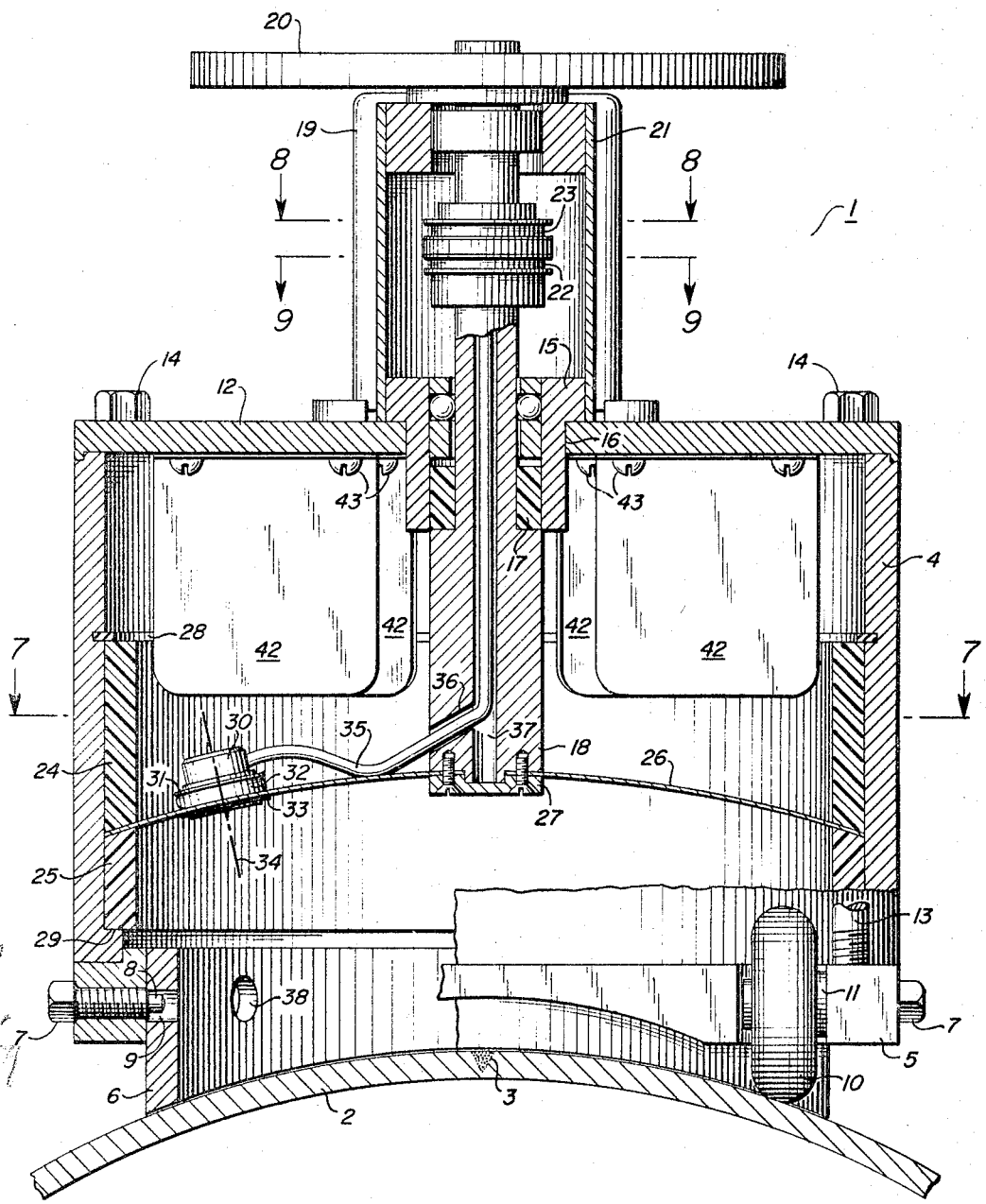
FIGURE 1 represents a vertical view, partially in medial section and partially broken away, of one embodiment of the present invention, together with a portion of the wall of the pipe being examined for variations in thickness adjacent the weld area.
Figure 2:
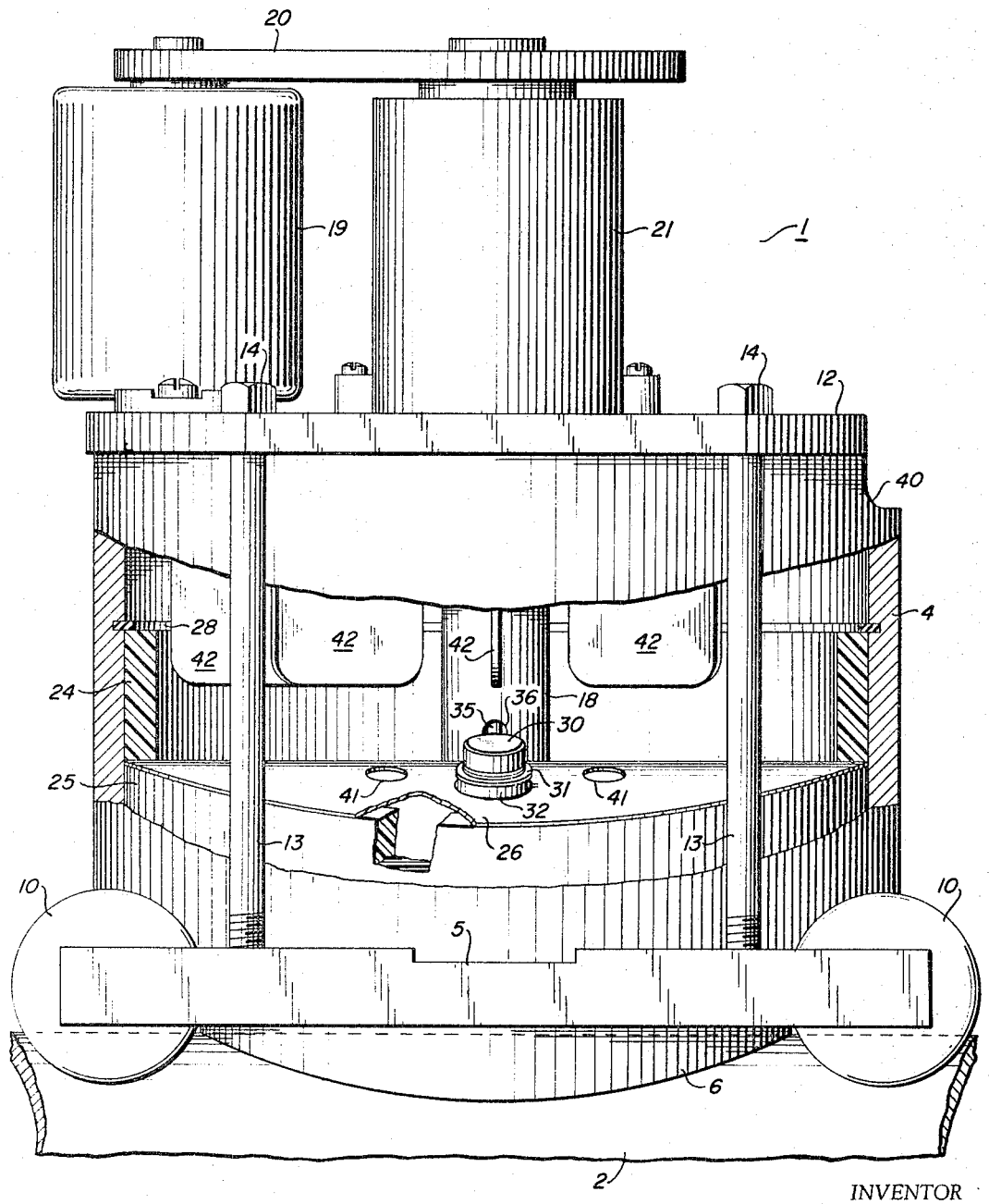
FIGURE 2 represents a vertical view, partially in medial section and partially broken away, of the embodiment of FIGURE 1, taken at right angles to FIGURE 1.
Figure 3:
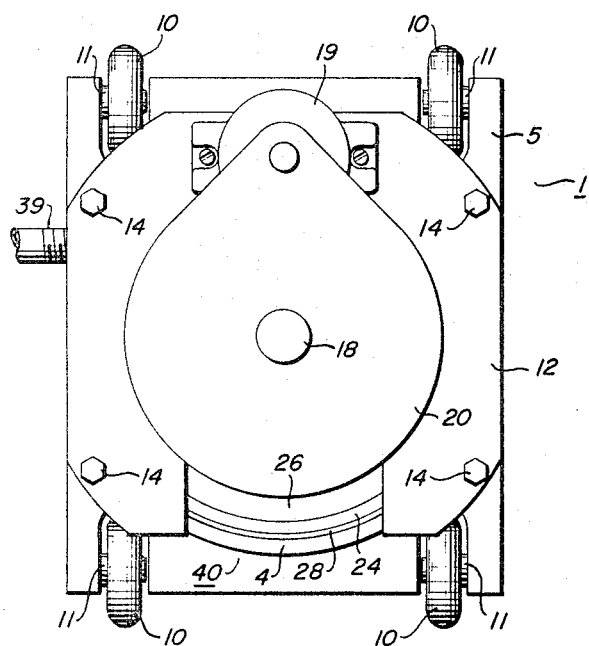
FIGURE 3 represents a view in plan of the embodiment of FIGURE 1, and is also representative of the plan views of the other embodiments herein described.

Referring now to that embodiment of FIGURES 1–3, ultrasonic thickness measuring apparatus 1 is shown in operative relation to pipe 2 having longitudinal weld 3 in a wall thereof.

Ultrasonic thickness measuring apparatus 1 comprises main chamber housing 4, base frame 5 supporting main chamber housing 4, and seal ring 6 mounted within the lower portion of ultrasonic thickness measuring apparatus 1 within base frame 5. Preferably, for reasons which will hereinafter appear, seal ring 6 is permitted a certain amount of freedom for rotation in a horizontal plane and movement in a vertical plane. This is attained by providing threaded bolts 7 screwed through base frame 5 and having tips 8 extending into circular recesses 9 in the wall of said seal ring 6, the circular recesses 9 having a larger diameter than that of the said tips 8. The bottom of seal ring 6 is cylindrically concave, of a radius of curvature essentially equal to the radius of pipe 2 so as to substantially isolate that portion of the wall of pipe 2 lying within the periphery of said seal ring 6 from the remainder of the wall of pipe 2.

Wheels 10 are rotatably mounted to base frame 5 by means of axles 11. It will be noted that wheels 10 are set down far enough relative to the bottom of seal ring 6 so that, when the said wheels 10 engage the wall of pipe 2 straddling longitudinal weld 3, there will be a slight clearance between the bottom of seal ring 6 and the said pipe 2.

Cover plate 12 is mounted on the top of main chamber housing 4. Bolts 13, extending through the cover plate 12 and threaded into base frame 5, hold cover plate 12, main chamber housing 4 and base frame 5 securely together as an assembly, the heads 14 of the said bolts bearing down on the top of cover plate 12.

Bushing 15 is mounted through central apertures 16 of cover plate 12, and bearing assembly 17 is provided in bushing 16. Shaft 18 is rotatably mounted in bearing assembly 17. Motor 19 is mounted to the cover plate 12, and reduction gears (not shown) in reduction gear housing 20 are operatively interposed between the said motor 19 and the top of the said shaft 18, whereby the latter can be rotated at any desired speed.

Within enclosure 21 secured to the top of cover plate 12, suitably insulated slip rings 22 and 23, mounted to shaft 18, engage brushes (not shown) for electrical communication with external circuitry (not shown) relating to the ultrasonic generation, conversion and display functions, the details of which form no part of the present invention.

Upper guide ring 24 and lower guide ring 25 are secured within main chamber housing 4, adjacent the inside of the wall thereof, and are preferably constructed of material having a low coefficient of friction. The bottom surface of upper guide ring 24 has a concave cylindrical configuration which is so disposed within main chamber housing 4 that the longitudinal axis of said concave cylindrical configuration substantially coincides with the longitudinal axis of the pipe 2. The top surface of lower guide ring 25 has a convex cylindrical configuration which is so disposed within main chamber housing 4 that the longitudinal axis of said convex cylindrical configuration substantially coincides with the longitudinal axis of the pipe 2.

The bottom surface of upper guide ring 24 and the top surface of lower guide ring 25, when assembled in main chamber housing 4 are spaced from each other sufficiently to slidably receive the edge of thin, flexible disc 26, preferably metallic, the said disc 26 being centrally mounted to shaft 18 by means of member 27. It will be seen that, as shaft 18 rotates, disc 26 rotates and its peripheral contour follows that of the space between upper guide ring 24 and lower guide ring 25, viz. a cylinder having its longitudinal axis substantially coinciding with the longitudinal axis of pipe 2. Retaining ring 28 prevents upward movement of upper guide ring 24, and shoulder 29 prevents downward movement of lower guide ring 25, as disc 26 moves between the said upper guide ring 24 and lower guide ring 25.

An ultrasonic transducer transmitter-receiver 30, for example a piezoelectric crystal, is mounted through disc 26 adjacent the extremity thereof by means of upper retaining ring 31, elastomeric ring 32 and lower ring 33, the radiating axis, indicated by line 34, of the said ultrasonic transducer 30 perpendicularly intersecting the longitudinal axis of the cylindrical surface to which the said disc 26 is constrained, which is also the longitudinal axis of pipe 2, said radiating axis 34 thus being substantially perpendicular to the wall of pipe 2 independent of the horizontal angular orientation or azimuth of ultrasonic transducer 30 relative to the vertical longitudinal axis of the said shaft 18.

The electrical connections for ultrasonic transducer 30 are indicated generally by line 35 electrically communicating between ultrasonic transducer 30 and slip rings 22 and 23 through bore 36 and axial bore 37 in shaft 18.

Inlet port 38 is provided in seal ring 6 for the introduction of coupling liquid such as water (not shown) and is served by pipe 39. An overflow port 40 is provided at the top of main chamber housing 4, ports 41 in disc 26 permitting passage of coupling liquid from one side of disc 26 to the other side thereof. Baffles 42 are secured to cover plate 12 by means of screws 43, and extend downwardly into the body of main chamber housing 4 to reduce turbulence in the coupling liquid when ultrasonic thickness measuring apparatus 1 is in operation.

The operation of ultrasonic thickness measuring apparatus 1 will now be described.

Ultrasonic thickness measuring apparatus 1 is supported in stationary position on pipe 2 moving at mill production speeds, by means of wheels 10 straddling longitudinal weld 3, the longitudinal axis of the cylindrical surface defined by disc 26 coinciding with the longitudinal axis of pipe 2. Preferably, the longitudinal axis of shaft 18 intersects longitudinal weld 3. Coupling liquid is introduced through inlet port 38 into seal ring 6, and rises through ports 41 in disc 26 to fill main chamber housing 4. It is intended that seal ring 6 conform rather closely with the surface of pipe 2, so that the clearance therebetween is minimal, but in practice the seal ring 6 will ride up and down and rotate in a horizontal plane, within the limits permitted by tips 8 of bolt 7 extending into circular recesses 9, due to occasional surface imperfections, and variations in alignment, of pipe 2. Thus, there will be such clearance between seal ring 6 and pipe 2 as will permit coupling liquid to leak out therebetween. For this reason, coupling liquid is introduced through inlet port 38 at such rate as to provide a continual discharge thereof through overflow port 40. In this manner, main chamber housing 4 is always maintained filled with coupling liquid.

Figure 4:
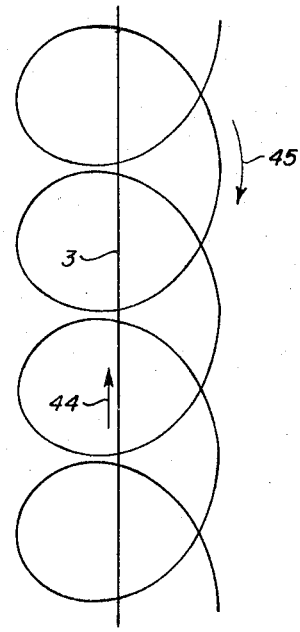
FIGURE 4 represents diagrammatically the locus of the ultrasonic transducer of the embodiment of FIGURE 1 projected on to the moving pipe being examined for wall thickness variations in the weld area.

Motor 19 rotates shaft 18 at the desired speed, and hence disc 26 and ultrasonic transducer 30 are also rotated at the desired speed. Due to the shape of the constrained path of disc 26, and the relation of this path with the cylindrical surface of pipe 2, the radiating axis 34 of ultrasonic transducer 30 is always normal to the surface of pipe 2 and ultrasonic transducer 30 is always the same distance from the surface of pipe 2. This provides a uniform path length for the ultrasonic signals transmitted by ultrasonic transducer 30, and reflected back to ultrasonic transducer 30 by the outer and inner surfaces of the wall of pipe 2, as the ultrasonic transducer 30 scans the surface of pipe 2. Conventional ultrasonic circuitry is operatively related to the apparatus described through slip rings 22 and 23. Each 360° of rotation of disc 26 provides a total of one scan in each direction over the longitudinal weld 3 in pipe 2. The scanning rate is adjustable, and thickness information can be obtained at rates of several scans per foot of pipe 2 at mill production speeds. Baffles 42 maintain the coupling liquid in a quiescent state during operation. A typical locus of ultrasonic transducer 30 projected on moving pipe 2 (i.e., a typical locus of radiating axis 34 projected on moving pipe 2, or even more specifically, a typical locus of the scan of moving pipe 2) is shown diagrammatically in FIGURE 4, the relative direction of longitudinal weld 3 being indicated by arrow 44, and the relative direction of ultrasonic transducer 30 being indicated by arrow 45.

Figure 5:
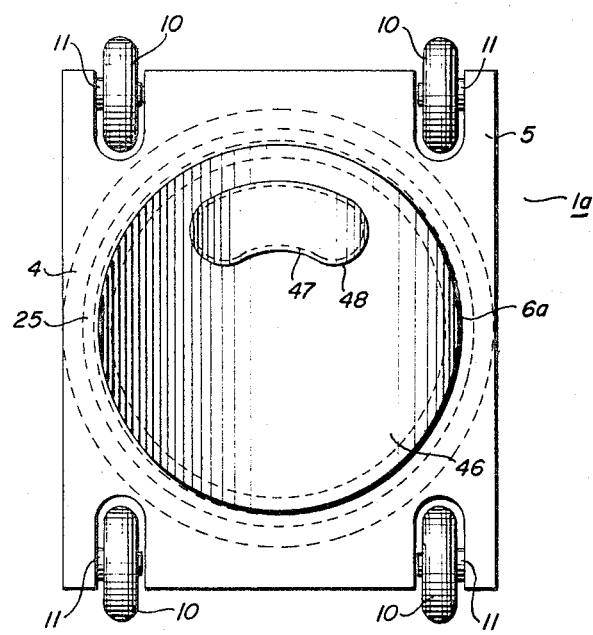
FIGURE 5 represents a bottom plan view of another embodiment of the present invention, particularly suited for measuring the wall thickness of hot pipe.

In that embodiment of the invention shown in FIGURE 5, ultrasonic thickness measuring apparatus 1a is essentially the same in construction as ultrasonic thickness measuring apparatus 1 of FIGURES 1–3, except that seal ring 6a includes a bottom plate 46 secured to and closing the bottom of said seal ring 6a. Bottom plate 46 has a cylindrical configuration with a longitudinal axis coinciding with the longitudinal axis of pipe 2. Bottom plate 46 includes an ultrasonic transparent window. Preferably, an arcuate slot 47, located on at least part of the projected path of radiating axis 34 of ultrasonic transducer 30, is formed in bottom plate 46 so as to traverse longitudinal weld 3 when ultrasonic thickness measuring apparatus 1a is positioned over pipe 2, said slot 47 extending equally to either side of the longitudinal weld 3, which arcuate slot 47 is covered and sealed by ultrasonic transparent material 48 secured to the said bottom plate 46. A silicone rubber has been found to be suitable for this purpose, as it is adequately transparent to ultrasonic energy and will not cause interfering reflections, and also because it is tough and resilient and will ride smoothly on the surface of hot pipe 2 so that, in effect, it constitutes an extension of the coupling liquid to couple ultrasonic transducer 30 to pipe 2. This embodiment is well suited, not only for pipes 2 which are so hot as to otherwise cause bubbles in coupling liquid directly contacting the same (which bubbles would produce interfering reflections during the ultrasonic thickness measuring operation), but also for short lengths of pipe 2, it being desirable not to have main chamber housing 4 completely and frequently empty itself of coupling liquid when the ends of such short lengths of pipe 2 are reached.

Figure 6:
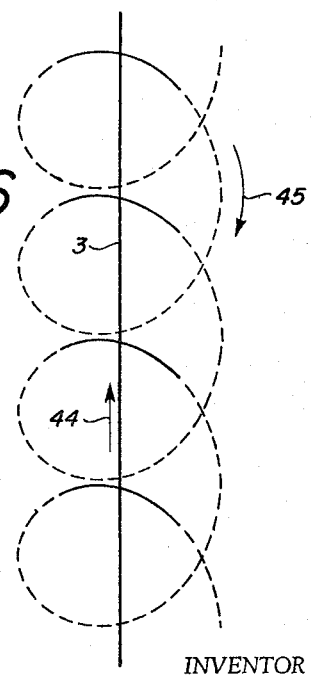
FIGURE 6 represents diagrammatically the locus or scan of the ultrasonic transducer of the embodiment of FIGURE 5 projected on to the moving pipe being examined for wall thickness variations in the weld area, the active or operative part of the scan being indicated by solid lines and the inactive or inoperative part of the scan being indicated by dashed lines.

The operation of ultrasonic thickness measuring apparatus 1a is essentially the same as that for ultrasonic thickness measuring apparatus 1 previously described except that pipe 2 is scanned only for a period of time substantially corresponding with that required for radiating axis 34 to traverse the ultrasonic transparent window. Thus, either or both slip rings 22 and 23 can be provided with active and inactive segments, as is known in the electrical art, so that ultrasonic transducer 30 is operative only for a predetermined period of time. Also, the reflected signals reconverted in ultrasonic transducer 30 can be gated to eliminate reflections from bottom plate 46, as is known in the electrical art. FIGURE 6 is generally similar to FIGURE 4 and shows diagrammatically a typical locus of ultrasonic transducer 30 projected onto moving pipe 2, the solid portions of the locus representing those periods during which pipe 2 is being ultrasonically scanned, and the dashed portions of the locus representing those periods during which pipe 2 is not being ultrasonically scanned.

Figure 7:
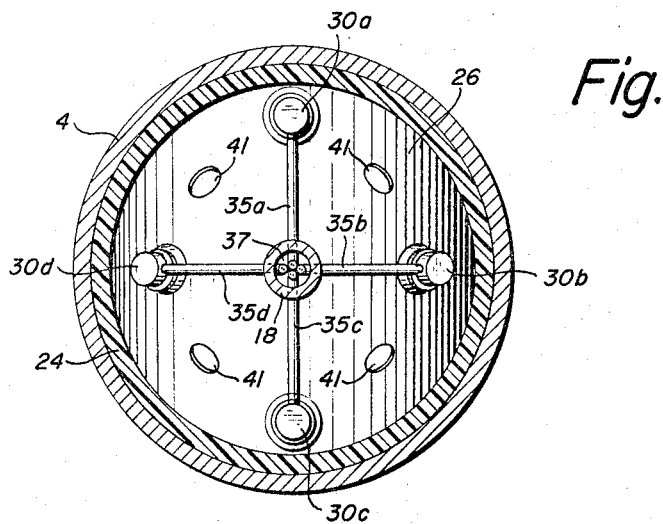
FIGURE 7 represents a reduced section in plan of another embodiment employing a plurality of ultrasonic transducers, which embodiment is otherwise generally similar to the embodiment of FIGURE 1, taken along the line 7—7 of FIGURE 1.
Figure 8:
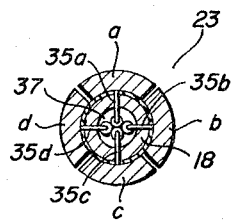
FIGURE 8 represents a section in plan of one of the commutators of the embodiment of FIGURE 7, taken along the line 8—8 of FIGURE 1.
Figure 9:
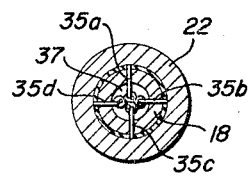
FIGURE 9 represents a section in plan of the other commutator of the embodiment of FIGURE 7, taken along the line 9—9 of FIGURE 1.
Figure 10:
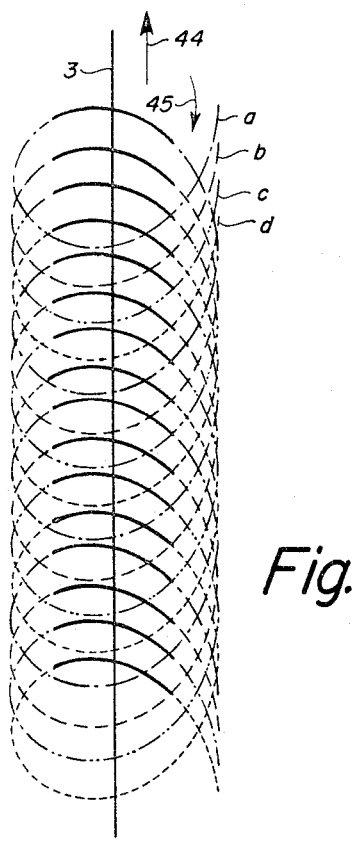
FIGURE 10 represents diagrammatically the loci or scans of the ultrasonic transducers of the embodiment of FIGURE 7 projected on to the moving pipe being examined for wall thickness variations in the weld area, the active or operative parts of the scans being indicated by solid lines and the inactive or inoperative parts of the scans being indicated by dashed lines.

In that embodiment of the invention, shown in FIGURES 7–9, a plurality of ultrasonic transducers 30a, 30b, 30c, 30d are provided, the electrical wiring 35a, 35b, 35c, 35d for each of the ultrasonic transducers passing through axial bore 37 in shaft 18 to the suitably insulated slip rings 22 and 23, slip ring 23 being provided with separate segments a, b, c, d corresponding with ultrasonic transducers 30a, 30b, 30c, 30d, respectively, and slip ring 22 being a common connection or ground to all the said ultrasonic transducers, whereby the said ultrasonic transducers are sequentially activated. This embodiment can be used with apparatus including seal ring 6 or seal ring 6a, and the operation is essentially the same as hereinbefore described. FIGURE 10 shows diagrammatically typical loci a, b, c, d of ultrasonic transducers 30a, 30b, 30c, 30d, respectively, projected onto moving pipe 2, the solid portions of the loci representing those periods during which pipe 2 is being ultrasonically scanned by the respective ultrasonic transducers, and the dashed portions of the loci representing those periods during which pipe 2 is not being ultrasonically scanned by the respective ultrasonic transducers, the relative direction of longitudinal weld 3 being indicated by arrow 44, and the relative directions of all the ultrasonic transducers 30a, 30b, 30c, 30d being indicated by arrow 45.

From the foregoing, it will be seen that apparatus has been provided which makes use of simple rotation at uniform velocity to scan a segment of pipe wall with ultrasonic transducer means to obtain thickness information as the pipe moves at production speeds.

I claim:
1. Apparatus for ultrasonically scanning a tubular member having a longitudinal axis, said apparatus comprising:
 (a) ultrasonic transducer means adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
 (b) shaft means having a longitudinal axis perpendicular to the surface of said tubular member and perpendicularly intersecting the longitudinal axis of said tubular member, said longitudinal axis of said shaft means and said tubular member being relatively movable in a direction parallel to the longitudinal axis of said tubular member,
 (c) means connecting said ultrasonic transducer means and said shaft means and mounting said ultrasonic transducer means for revolution about the longitudinal axis of said shaft means upon rotation of said shaft means with the radiating axis of said ultrasonic transducer means normal to the surface of said tubular member and with the distance between said ultrasonic transducer means and the surface of said tubular member constant.

2. Apparatus for ultrasonically scanning a longitudinal weld in a tubular member having a longitudinal axis, said apparatus comprising:
 (a) ultrasonic transducer means adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
 (b) shaft means having a longitudinal axis perpendicular to the surface of said tubular member and perpendicularly intersecting said longitudinal weld and said longitudinal axis of said tubular member, said longitudinal axis of said shaft means and said tubular member being relatively movable in a direction parallel to the longitudinal axis of said tubular member,
 (c) means connecting said ultrasonic transducer means and said shaft means and mounting said ultrasonic transducer means for revolution about the longitudinal axis of said shaft means upon rotation of said shaft means with the radiating axis of said ultrasonic transducer means normal to the surface of said tubular member and with the distance between said ultrasonic transducer means and the surface of said tubular member constant.

3. Apparatus for ultrasonically scanning a tubular member having a longitudinal axis, said apparatus comprising:
 (a) a chamber means mounted above said tubular member, the lower portion of said chamber means having a configuration closely engaging the surface of said tubular member completely around the periphery of said lower portion,
 (b) vertically disposed shaft means extending into said chamber means and having a longitudinal axis perpendicular to the surface of said tubular member and perpendicularly intersecting the longitudinal axis of said tubular member,
 (c) motor means adapted to rotate said shaft means,
 (d) ultrasonic transducer means in said chamber means, said ultrasonic transducer means being adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
 (e) mounting means securing said ultrasonic transducer means to said shaft means for revolution about the longitudinal axis of said shaft means as said shaft means is rotated about its longitudinal axis, said mounting means constraining motion of said ultrasonic transducer means to a path in which the radiating axis of said ultrasonic transducer means is always perpendicular to the surface of said tubular member and the distance between said ultrasonic transducer means and the surface of said tubular member is always constant,
 (f) said longitudinal axis of said shaft means and said tubular member being relatively movable in a direction parallel to the longitudinal axis of said tubular member,
 (g) inlet means to introduce coupling liquid into said chamber means between said ultrasonic transducer means and the surface of said tubular member.

4. Apparatus as in claim 3, further comprising:

(h) closure means closing the bottom of said chamber means and supporting the coupling liquid thereabove,
(i) window means in said closure means transparent to said ultrasonic mechanical signal and impermeable to the passage of coupling liquid therethrough, said window means being located at least partially on the radiating axis of said ultrasonic transducer means.

5. Apparatus as in claim 4, further comprising:
(j) said window means comprising a membrane adapted to slidably engage the surface of said tubular member.

6. Apparatus as in claim 3, further comprising:
(h) said mounting means comprising:
   a channel provided around the inner periphery of said chamber means,
   a member secured to said shaft means and guided by said channel, said member mounting said ultrasonic transducer means.

7. Apparatus as in claim 6, further comprising:
(i) closure means closing the bottom of said chamber means and supporting the coupling liquid thereabove,
(j) window means in said closure means transparent to said ultrasonic mechanical signal and impermeable to the passage of coupling liquid therethrough, said window means being located at least partially on the radiating axis of said ultrasonic transducer means.

8. Apparatus as in claim 7, further comprising:
(k) said window means comprising a membrane adapted to slidably engage the surface of said tubular member.

9. Apparatus as in claim 3, further comprising:
(h) said ultrasonic transducer means comprising a plurality of ultrasonic transducers radially spaced around said shaft means.

10. Apparatus for ultrasonically scanning a tubular member having a longitudinal axis, said apparatus comprising:
(a) chamber means mounted above said tubular member,
(b) vertically disposed shaft means extending into said chamber means and having a longitudinal axis perpendicular to the surface of said tubular member and perpendicularly intersecting the longitudinal axis of said tubular member,
(c) motor means adapted to rotate said shaft means,
(d) ultrasonic transducer means in said chamber means, said ultrasonic transducer means being adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
(e) mounting means securing said ultrasonic transducer means to said shaft means for revolution about the longitudinal axis of said shaft means as said shaft means is rotated about its longitudinal axis, said mounting means constraining motion of said ultrasonic transducer means to a path in which the radiating axis of said ultrasonic transducer means is always perpendicular to the surface of said tubular member and the distance between said ultrasonic transducer means and the surface of said tubular member is always constant,
(f) said longitudinal axis of said shaft means and said tubular member being relatively movable in a direction parallel to the longitudinal axis of said tubular member,
(g) inlet means to introduce coupling liquid into said chamber means between said ultrasonic transducer means and the surface of said tubular member,
(h) closure means closing the bottom of said chamber means and supporting the coupling liquid thereabove,
(i) window means in said closure means transparent to said ultrasonic mechanical signal, and impermeable to the passage of coupling liquid therethrough, said window means being located at least partially on the radiating axis of said ultrasonic transducer means,
(j) said window means comprising a membrane adapted to slidably engage the surface of said tubular member.

11. Apparatus for ultrasonically scanning a longitudinal weld in a lengthwise-moving tubular member having a longitudinal axis, said apparatus comprising:
(a) chamber means mounted above said tubular member, the lower portion of said chamber means having a configuration closely engaging the surface of said tubular member completely around the periphery of said lower portion,
(b) vertically disposed shaft means extending into said chamber means and having a longitudinal axis perpendicular to the surface of said tubular member and perpendicularly intersecting the longitudinal axis of said tubular member and said longitudinal weld therein,
(c) motor means adapted to rotate said shaft means,
(d) ultrasonic transducer means in said chamber means, said ultrasonic transducer means being adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
(e) mounting means securing said ultrasonic transducer means to said shaft means for revolution about the longitudinal axis of said shaft means as said shaft means is rotated about its longitudinal axis, said mounting means constraining motion of said ultrasonic transducer means to a path in which the radiating axis of said ultrasonic transducer means is always perpendicular to the surface of said tubular member and the distance between said ultrasonic transducer means and the surface of said tubular member is always constant,
(f) said longitudinal axis of said shaft means and said tubular member being relatively movable in a direction parallel to the longitudinal axis of said tubular member,
(g) inlet means to introduce coupling liquid into said chamber means between said ultrasonic transducer means and the surface of said tubular member.

12. Apparatus as in claim 11, further comprising:
(h) closure means closing the bottom of said chamber means and supporting the coupling liquid thereabove,
(i) window means in said closure means transparent to said ultrasonic mechanical signal and impermeable to the passage of coupling liquid therethrough, said window means being located at least partially on the radiating axis of said ultrasonic transducer means.

13. Apparatus as in claim 12, further comprising:
(j) said window means comprising a membrane adapted to slidably engage the surface of said tubular member.

14. Apparatus as in claim 11, further comprising:
(h) said mounting means comprising:
   a channel provided around the inner periphery of said chamber means,
   a member secured to said shaft means and guided by said channel, said member mounting said ultrasonic transducer means.

15. Apparatus as in claim 14, further comprising:
(i) closure means closing the bottom of said chamber means and supporting the coupling liquid thereabove,
(j) window means in said closure means transparent to said ultrasonic mechanical signal and impermeable to the passage of coupling liquid therethrough, said window means being located at least partially on the radiating axis of said ultrasonic transducer means.

16. Apparatus as in claim 15, further comprising:
   (k) said window means comprising a membrane adapted to slidably engage the surface of said tubular member.

17. Apparatus for ultrasonically scanning a longitudinal weld in a lengthwise-moving tubular member having a longitudinal axis, said apparatus comprising:
   (a) chamber means mounted above said tubular member,
   (b) vertically disposed shaft means extending into said chamber means and having a longitudinal axis perpendicular to the surface of said tubular member and perpendicularly intersecting the longitudinal axis of said tubular member and said longitudinal weld therein,
   (c) motor means adapted to rotate said shaft means,
   (d) ultrasonic transducer means in said chamber means, said ultrasonic transducer means being adapted to propagate an ultrasonic mechanical signal along a radiating axis thereof towards said tubular member and adapted to receive an ultrasonic mechanical signal reflected from said tubular member along said radiating axis and convert said received ultrasonic mechanical signal to an electric current,
   (e) mounting means securing said ultrasonic transducer means to said shaft means for revolution about the longitudinal axis of said shaft means as said shaft means is rotated about its longitudinal axis, said mounting means constraining motion of said ultrasonic transducer means to a path in which the radiating axis of said ultrasonic transducer means is always perpendicular to the surface of said tubular member and the distance between said ultrasonic transducer means and the surface of said tubular member is always constant,
   (f) said longitudinal axis of said shaft means and said tubular member being relatively movable in a direction parallel to the longitudinal axis of said tubular member,
   (g) inlet means to introduce coupling liquid into said chamber means between said ultrasonic transducer means and the surface of said tubular member,
   (h) closure means closing the bottom of said chamber means and supporting the coupling liquid thereabove,
   (i) window means in said closure means transparent to said ultrasonic mechanical signal and impermeable to the passage of coupling liquid therethrough, said window means being located at least partially on the radiating axis of said ultrasonic transducer means,
   (j) said window means comprising a membrane adapted to slidably engage the surface of said tubular member.

18. Apparatus as in claim 17, further comprising:
   (k) said mounting means comprising:
      a channel provided around the inner periphery of said chamber means,
      a member secured to said shaft means and guided by said channel, said member mounting said ultrasonic transducer means.

19. Apparatus as in claim 17, further comprising:
   (k) said chamber means having a horizontally circular inner periphery,
   (l) said mounting means comprising:
      low-friction liner means secured to the inner periphery of said chamber means, said liner means having a groove formed in and entirely around its inner periphery, the height of said groove above the surface of said tubular member being constant for all points on said groove,
      a flexible disc centrally secured to said shaft means, the periphery of said disc slidably engaging said groove and guided thereby as said disc is rotated by said shaft means, said disc mounting said ultrasonic transducer means.

References Cited

UNITED STATES PATENTS

| | | | |
|---|---|---|---|
| 3,242,723 | 3/1966 | Evans | 73—67.8 XR |
| 3,280,621 | 10/1966 | Cardinal et al. | 73—67.8 |
| 3,289,468 | 12/1966 | Van der Veer et al. | 73—67.8 XR |
| 3,308,652 | 3/1967 | Appel et al. | 73—67.8 XR |

RICHARD C. QUEISSER, *Primary Examiner.*

JAMES GILL, *Examiner.*

JOHN P. BEAUCHAMP, Jr., *Assistant Examiner.*